(12) United States Patent
Zhang et al.

(10) Patent No.: US 12,502,878 B2
(45) Date of Patent: Dec. 23, 2025

(54) LAMINATION DEVICE AND A LAMINATION METHOD

(71) Applicant: Yungu (Gu'an) Technology Co., Ltd., Hebei (CN)

(72) Inventors: Shuai Zhang, Hebei (CN); Chunxiao Gu, Hebei (CN); Yahong Yuan, Hebei (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 129 days.

(21) Appl. No.: 18/177,915

(22) Filed: Mar. 3, 2023

(65) Prior Publication Data

US 2023/0202158 A1 Jun. 29, 2023

Related U.S. Application Data

(63) Continuation of application No. PCT/CN2021/120869, filed on Sep. 27, 2021.

(30) Foreign Application Priority Data

Dec. 14, 2020 (CN) .......................... 202011464973.2

(51) Int. Cl.
*B32B 37/00* (2006.01)
*B32B 37/10* (2006.01)
*B32B 39/00* (2006.01)

(52) U.S. Cl.
CPC ............ *B32B 37/003* (2013.01); *B32B 37/10* (2013.01); *B32B 39/00* (2013.01)

(58) Field of Classification Search
CPC ..... B29C 66/342; B29C 66/345; B29C 66/81; B29C 66/81457; B29C 66/81421;
(Continued)

(56) References Cited

U.S. PATENT DOCUMENTS 3,873,395 A * 3/1975 Ehrlich ................... B32B 21/08
100/211
2017/0100922 A1 4/2017 Kim et al.
(Continued)

FOREIGN PATENT DOCUMENTS

CN 106585045 A 4/2017
CN 110588132 A 12/2019
(Continued)

OTHER PUBLICATIONS

Machine translation of KR 20200101810 date unknown.*
(Continued)

*Primary Examiner* — John L Goff, II
(74) *Attorney, Agent, or Firm* — Maier & Maier, PLLC

(57) ABSTRACT

A lamination apparatus and a lamination method, which are used for laminating a curved cover plate to a flexible screen. The lamination apparatus includes: a support member; a deformation bearing member, which includes special-shaped bearing portions arranged opposite each other, and a deformable portion connected between the special-shaped bearing portions, the deformable portion being supported by the support member; and a flexible pad, which is disposed on the side of the deformation bearing member facing away from the support member, the flexible pad including a support surface for supporting a flexible screen and a fitting surface that is fitted with the deformable portion. The support surface is provided with a spinal segment located on the side of the deformable portion facing away from the support member and inclined segments located on both sides of the spinal segment.

13 Claims, 9 Drawing Sheets

(58) Field of Classification Search
CPC ........ B29C 66/81422; B29C 66/81423; B32B 37/003; B32B 37/10; B32B 38/1866; B32B 39/00; B32B 37/26; B32B 2037/264; B32B 2037/266; Y10T 156/1028; Y10T 156/1744
USPC .................................................. 156/212, 556
See application file for complete search history.

(56) References Cited

U.S. PATENT DOCUMENTS

| | | | |
|---|---|---|---|
| 2019/0229297 | A1 | 7/2019 | Hu et al. |
| 2022/0227112 | A1* | 7/2022 | Zhang .................. B32B 37/003 |

FOREIGN PATENT DOCUMENTS

| | | | |
|---|---|---|---|
| CN | 110861290 | A | 3/2020 |
| CN | 111086315 | A | 5/2020 |
| CN | 210837808 | U | 6/2020 |
| CN | 111497411 | A | 8/2020 |
| CN | 111862800 | A | 10/2020 |
| CN | 111981007 | A | 11/2020 |
| CN | 112606525 | A | 4/2021 |
| KR | 20150059566 | A | 6/2015 |
| KR | 102035243 | B1 | 10/2019 |
| KR | 20200101810 | A | 8/2020 |

OTHER PUBLICATIONS

International Search Report mailed Dec. 31, 2021, in International Application No. PCT/CN2021/120869, 6 pages.

Office Action issued on Apr. 21, 2022, in corresponding Chinese Application No. 202011464973.2, 17 pages (partial English translation provided).

* cited by examiner

LAMINATION DEVICE AND A LAMINATION METHOD

CROSS REFERENCE

This application is a continuation application of International Application No. PCT/CN2021/120869, filed on Sep. 27, 2021, which claims priority to the Chinese patent application No. 202011464973.2, filed on Dec. 14, 2020, both of which are hereby incorporated by reference in their entireties.

TECHNICAL FIELD

The present disclosure relates to the technical field of flexible screen lamination equipment, and in particular, to a lamination device and a lamination method.

BACKGROUND

With more and more time spent on screens, people's demand for full-screen screens has become stronger and stronger. In order to increase a screen ratio, a two-curved lamination technology and a four-curved lamination technology came into being.

In the related art, a flexible characteristics of a flexible screen is mainly used to make a full screen. At present, a lamination method for the flexible screen mainly uses a silicone pad, and presses the flexible screen to an inner side of a curved cover plate. During the lamination process, as lamination pressure on a flat area of the curved cover is greater than that on a bending area, the lamination pressure on the bending area is small, and air bubbles are easily formed, which will lead to poor lamination between the curved cover and the flexible screen.

SUMMARY

Embodiments of the present disclosure provide a lamination device and a lamination method, to solve a problem of air bubbles generated during a lamination process of a flexible screen and a cover plate.

A first aspect of the present disclosure provides a lamination device for laminating a curved cover plate to a flexible screen, comprising: a support member; a deformation bearing member, comprising a plurality of special-shaped bearing portions arranged opposite each other and a deformation portion connected between the special-shaped bearing portions, wherein the deformation portion is supported by the support member; a flexible pad, arranged on a side of the deformation bearing member away from the support member, wherein the flexible pad comprises a support surface for supporting the flexible screen and a fitting surface fitted with the deformation portion, the support surface comprises a spine segment located on a side of the deformation portion away from the support member and inclined segments located on two sides of the spine segment, wherein the deformation portion can be deformed from a first state to a second state under the action of a force along a height direction of the lamination device, so as to change the shape of the support surface via the deformation of the deformation portion, when the deformation portion is in the first state, the support surface is in a shape of a ridge, and in the process of the deformation portion changing from the first state to the second state, an inclination of the inclined segments gradually decreases.

A second aspect of the present disclosure provides a lamination method using the above lamination device to laminate a curved cover plate to a flexible screen, the method comprising steps of:

placing the flexible screen on the flexible pad, and making the deformation portion in the first state;

covering the curved cover plate on the flexible screen;

applying pressure to the curved cover plate, to deform the deformation portion from the first state to the second state, wherein the two special-shaped bearing portions move in a direction away from each other, and the curved cover plate and the flexible screen are gradually laminated from a position corresponding to the spine segment.

In the lamination device of the embodiment of the present disclosure, the lamination device includes a support member, a deformation bearing member and a flexible pad. The deformation bearing member includes a special-shaped bearing portion and a deformation portion. The flexible pad is supported on the deformation bearing member, the flexible pad has a support surface for bearing the flexible screen, and the support surface has a spine segment and an inclined segment. When the lamination device is used for laminating the flexible screen and the curved cover plate, the flexible screen can be arranged on the support surface.

The deformation portion can be deformed from the first state to the second state under the action of the force along the height direction of the lamination device. For example, when the curved cover applies a pressing force to the flexible screen on the support surface, under the pressing action of the support member and the curved cover plate, the deformation portion can be deformed from the first state to the second state, and the support surface of the flexible pad supported on the deformation portion can be deformed with the deformation of the deformation portion.

In the first state, the support surface is in the shape of a ridge, and the curved cover plate and the flexible screen are laminated on the flexible screen from the middle portion in this state. During the deformation of the deformation portion from the first state to the second state, the inclination of the inclined segment gradually decreases, and the curved cover plate and the flexible screen are gradually laminated. Therefore, in the lamination device provided in the embodiment of the present disclosure, the flexible screen and the curved cover plate can be brought into contact from the middle portion, and are gradually pressed from the middle to both sides, which can effectively improve a problem of lamination air bubbles between the curved cover plate and the flexible screen and improve product yield.

BRIEF DESCRIPTION OF THE DRAWINGS

Other features, objects and advantages of the present disclosure will become more apparent upon reading the following detailed description of non-limiting embodiments with reference to the accompanying drawings, wherein the same or similar reference numerals refer to the same or similar features.

DETAILED DESCRIPTION

Figure 1:
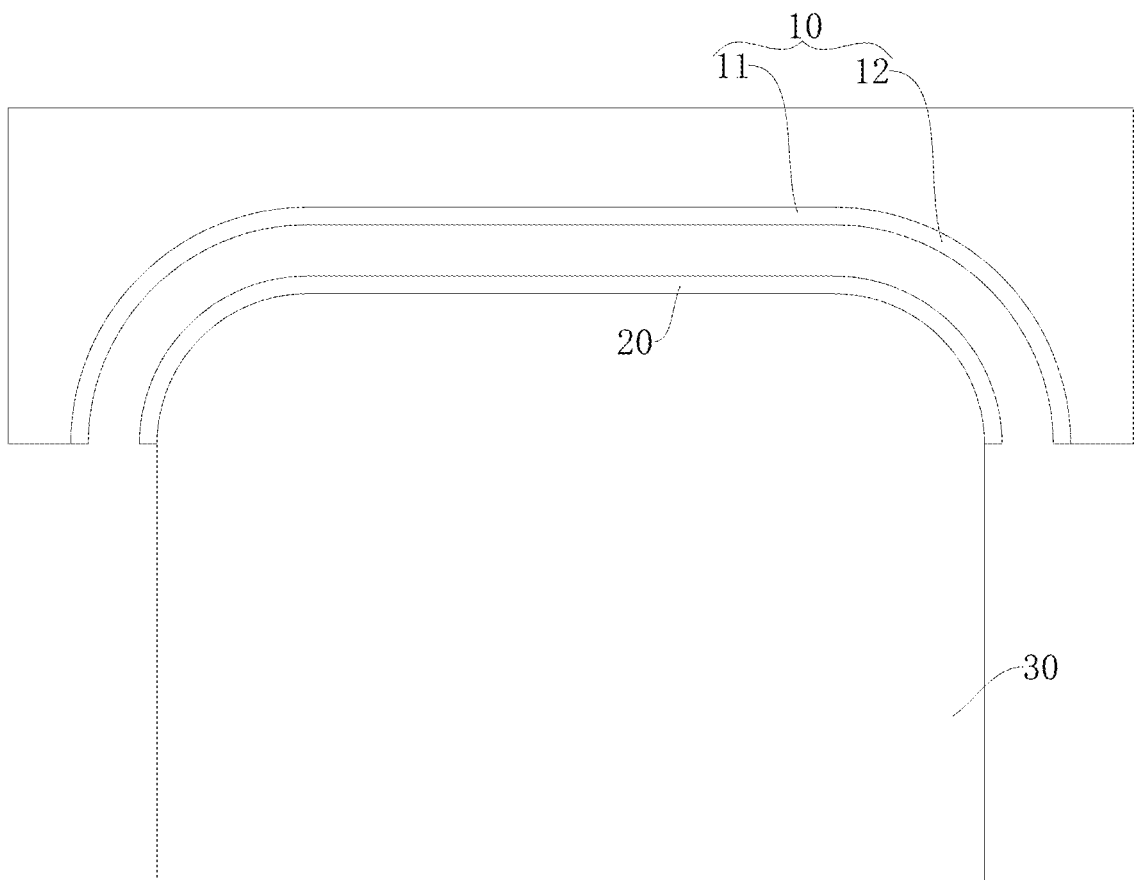
FIG. 1 is a structural diagram of a lamination device in the prior art.

Features and exemplary embodiments of various aspects of the present disclosure are described in detail below. In the following detailed description, numerous specific details are set forth in order to provide a thorough understanding of the present disclosure. However, it will be apparent to those skilled in the art that the present disclosure may be practiced without some of these specific details. The following description of embodiments is merely to provide a better understanding of the present disclosure by illustrating examples of the present disclosure. In the drawings and the following description, at least some well-known structures and techniques are not shown in order to avoid unnecessarily obscuring the present disclosure. And, for clarity, dimensions of some structures may be exaggerated. Furthermore, features, structures or characteristics described below may be combined in any suitable manner in one or more embodiments.

With more and more time spent on screens, people's demand for full-screen screens has become stronger and stronger. In order to increase a screen ratio, a two-curved lamination technology and a four-curved lamination technology came into being. However, at present, there is a problem of low yield in surface lamination.

As shown in FIG. 1, in the related art, a flexible silicone substrate 30 is generally used to realize a mutual lamination of a curved cover plate 10 and a flexible screen 20. The curved cover plate 10 includes a curved portion 12 and a flat portion 11. A typical curved cover plate 10 includes two curved portions 12 opposite to each other in the width direction of the curved cover plate 10, and the flat portion 11 is connected between the two curved portions 12. Each of the curved portions 12 has a large curvature, and the flat portion 11 is generally flat.

The flexible silicone base 30 in the related art includes a bearing surface, and the bearing surface is adapted to the curved cover plate 10 in shape. During a lamination process of the curved cover plate 10 and the flexible screen 20, the flexible screen 20 is first placed on the bearing surface, and then the curved cover plate 10 is pressed onto the flexible screen 20.

However, in the above-mentioned related art, as a lamination pressure on the flat portion 11 of the curved cover plate 10 is greater than that on the curved portions 12 thereof, lamination air bubbles easily appear on the curved portions 12, and a risk of lamination rebound is prone to occur, resulting in a poor lamination between the curved cover plate 10 and the flexible screen 20. And when the minimum distance between the two curved portions 12 is smaller than the width of the curved cover plate 10, that is, when an opening of the curved cover plate 10 is small, the curved cover plate 10 and the flexible screen 20 cannot be laminated.

The present disclosure is proposed to solve the above technical problem. For a better understanding of the present disclosure, a lamination device and lamination method of embodiments of the present disclosure will be described in detail below with reference to FIGS. 2 to 14.

Figure 2:
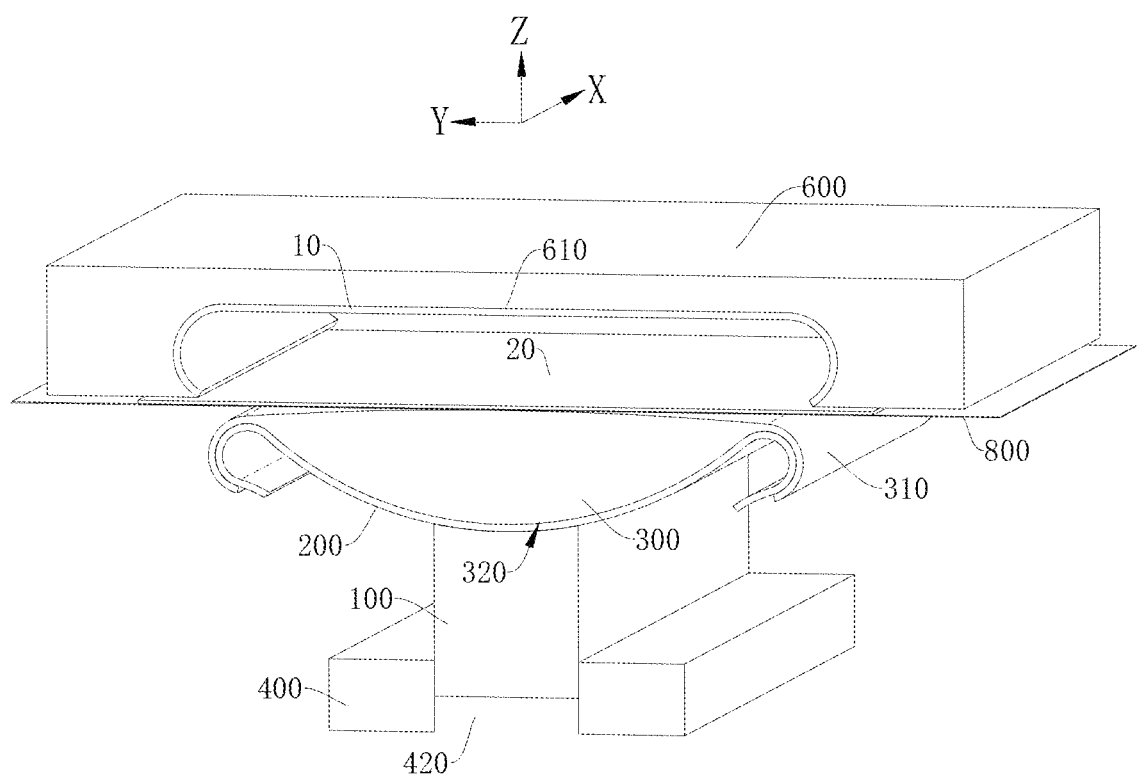
FIG. 2 is a schematic structural diagram of a lamination device provided by an embodiment of a first aspect of the present disclosure.
Figure 3:
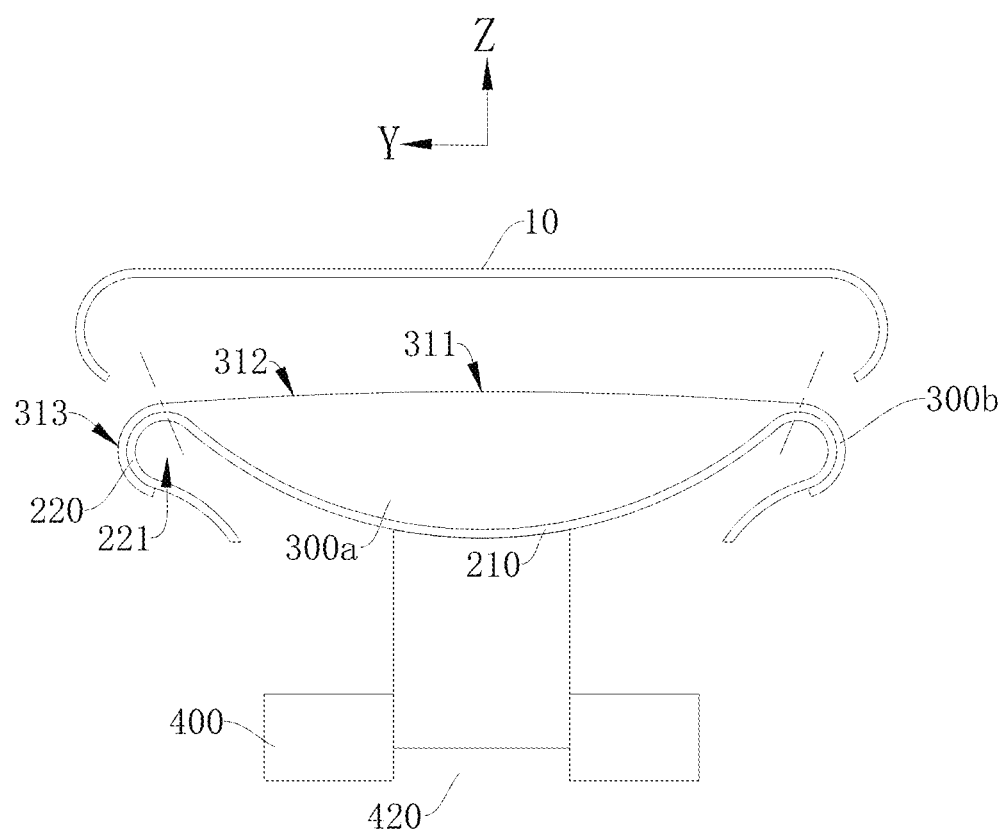
FIG. 3 is a front view of a lamination device provided by an embodiment of the first aspect of the present disclosure.

Please refer to FIG. 2 and FIG. 3 together. FIG. 2 is a schematic structural diagram of a lamination device 1 provided by an embodiment of a first aspect of the present disclosure, and FIG. 3 is a front view of a lamination device 1 provided by an embodiment of the first aspect of the present disclosure.

The lamination device 1 of the embodiment of the present disclosure is used for laminating the curved cover plate 10 and the flexible screen 20. The lamination device 1 includes: a support member 100; a deformation bearing member 200, including special-shaped bearing portions 220 arranged opposite each other and a deformation portion 210 connected between the special-shaped bearing portions 220, wherein the deformation portion 210 is supported by the support member 100; a flexible pad 300, arranged on a side of the deformation bearing member 200 away from the support member 100, wherein the flexible pad 300 includes a support surface 310 for supporting the flexible screen 20 and a fitting surface 320 fitted with the deformation portion 210. The support surface 310 includes a spine segment 311 located on a side of the deformation portion 210 away from the support member 100 and inclined segments 312 located on both sides of the spine segment 311. The deformation portion 210 can be deformed from a first state to a second state under the action of a force along a height direction of the lamination device 1, so as to change the shape of the support surface 310 via the deformation of the deformation portion 210, when the deformation portion 210 is in the first state, the support surface 310 is in the shape of a ridge, and in the process of the deformation portion 210 changing from the first state to the second state, an inclination of the inclined segment 312 gradually decreases.

In the present disclosure, when the deformation portion 210 is in the first state, the support surface 310 is in the shape of a ridge, so the distance between opposite ends of the deformation portion 210 along the Y direction is small, and the size of the deformation portion 210 in the Z direction is large. When the deformation portion 210 is in the second state, the inclination of the inclined segment 312 gradually decreases, the support surface 310 is gradually flattened from a ridge shape, so the distance between the opposite ends of the deformation portion 210 along the Y direction gradually increases, and the size of the deformation portion 210 in the Z direction gradually decreases.

The gradual decrease in the inclination of the inclined segment 312 means that an angle between the inclined segment 312 and a horizontal direction is gradually reduced. When the inclination of the inclined segment 312 gradually decreases, the support surface 310 is changed from a bent state to a flattened state.

Optionally, during the use of the lamination device 1, when the flexible screen 20 and the curved cover plate 10 are laminated to each other, the curved cover plate 10 applies a pressing force in the height direction on the flexible screen 20 located on the flexible pad 300.

In the lamination device 1 of the embodiment of the present disclosure, the lamination device 1 includes the support member 100, the deformation bearing member 200 and the flexible pad 300. The deformation bearing member 200 includes the special-shaped bearing portions 220 and the deformation portion 210. The flexible pad 300 is supported on the deformation bearing member 200. The flexible pad 300 includes the support surface 310 for bearing the flexible screen 20, and the support surface 310 includes a spine segment 311 and the inclined segment 312. When the lamination device 1 is used for laminating the flexible screen 20 and the curved cover plate 10, the flexible screen 20 may be disposed on the support surface 310.

The deformation portion 210 can be deformed from the first state to the second state under the action of the force along the height direction of the lamination device 1. For example, when the curved cover plate 10 applies a pressing force to the flexible screen 20 disposed on the support surface 310, and under the pressing action of the support member 100 and the curved cover plate 10, the deformation portion 210 can be deformed from the first state to the second state, and the support surface 310 of the flexible pad 300 supported on the deformation portion 210 can be deformed with the deformation of the deformation portion 210.

In the first state, the support surface 310 is in the shape of a ridge, and the curved cover plate 10 and the flexible screen 20 are laminated on the flexible screen 20 from the middle portion in this state. In the process of the deformation portion 210 deforming from the first state to the second state, the inclination of the inclined segment 312 gradually decreases, and the curved cover plate 10 and the flexible screen 20 are gradually laminated. Therefore, in the lamination device 1 provided by the embodiment of the present disclosure, the flexible screen 20 and the curved cover plate 10 can be brought into contact from the middle portion, and gradually pressed from the middle to both sides, which can effectively improve lamination air bubbles between the curved cover plate 10 and the flexible screen 20 and improve product yield.

In addition, in the lamination device 1 of the embodiment of the present disclosure, when the deformation portion 210 moves from the first state to the second state, the inclination of the inclined segment 312 gradually decreases, and the size of the deformation bearing member 200 and the flexible pad 300 in the Y direction gradually increases. The two curved portions 12 of the curved cover plate 10 are arranged oppositely to form an opening of the curved cover plate 10. When a bending angle of the curved portions 12 of the curved cover plate 10 is relatively large, and the smallest dimension between the two curved portions 12 of the curved cover plate 10 is smaller than the dimension of a flat portion 11, that is, the opening dimension of the curved cover plate 10 is smaller than the width of the curved cover plate 10, the curved cover 10 can still cover the support surface 310 of the flexible pad 300, so that the flexible screen 20 and the curved cover 10 are gradually pressed together from the inside to the outside.

Figure 4:
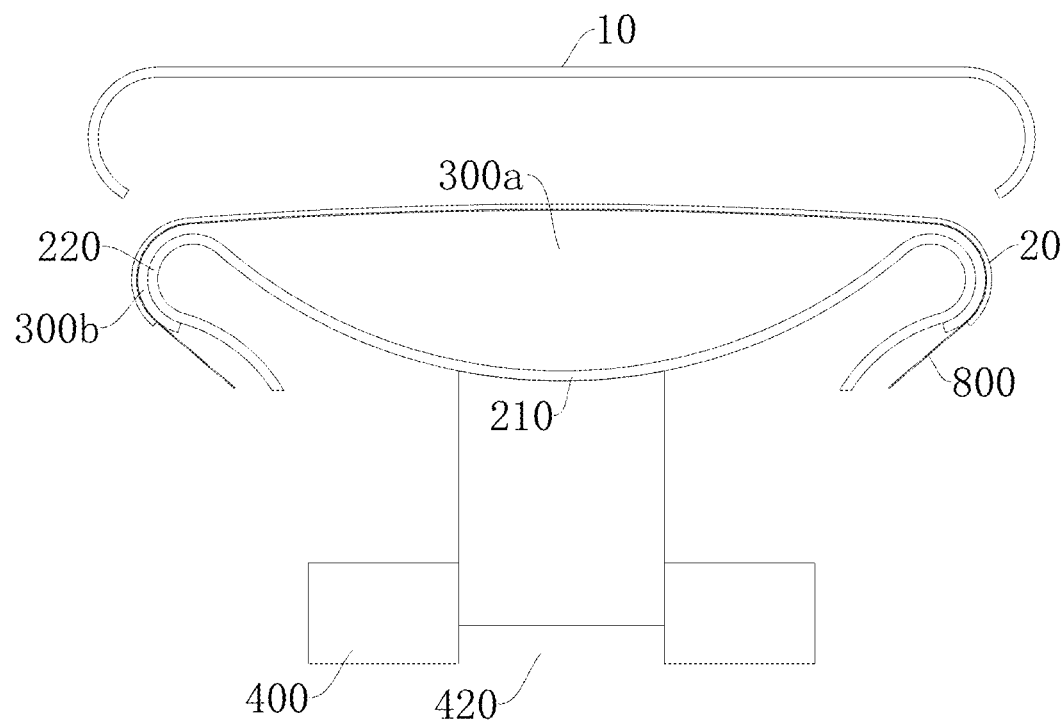
FIG. 4 is a schematic structural diagram of a lamination device provided by an embodiment of the first aspect of the present disclosure in a first state.
Figure 5:
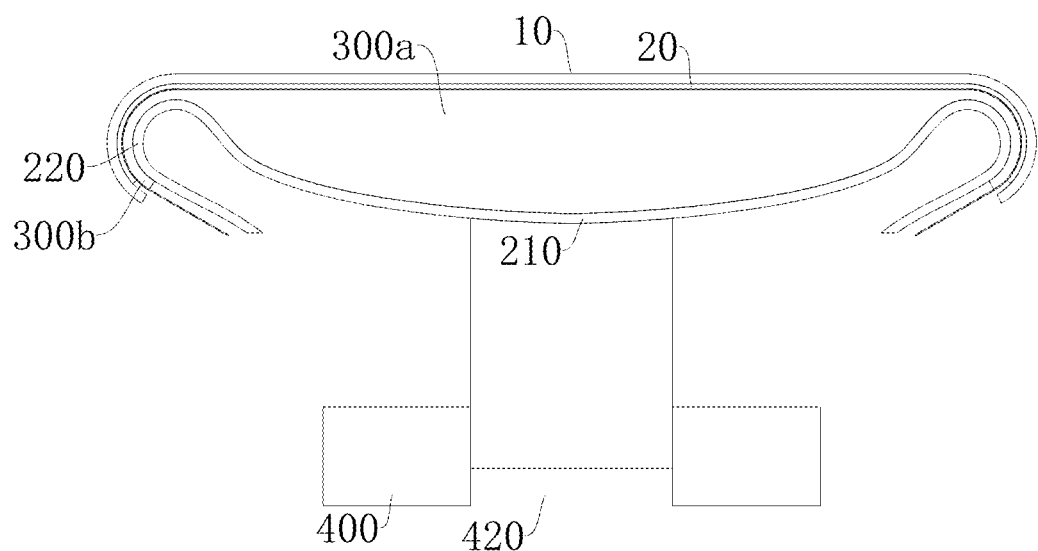
FIG. 5 is a schematic structural diagram of a lamination device provided by an embodiment of the first aspect of the present disclosure in a second state.

There are many ways to set the first state and the second state. Please refer to FIG. 4 and FIG. 5 together. FIG. 4 is a schematic structural diagram of a lamination device 1 provided by an embodiment of the first aspect of the present disclosure in a first state. FIG. 5 is a schematic structural diagram of a lamination device 1 provided by an embodiment of the first aspect of the present disclosure in a second state. In the process of the deformation portion 210 of the deformation bearing member 200 deforming from the first state to the second state, the inclined shape of the inclined segment 312 as shown in FIG. 4 is changed to the flat shape as shown in FIG. 5

Optionally, the first state is, for example, a natural state of the deformation portion 210. That is, when the deformation bearing member 200 is in the natural state, the deformation portion 210 is in the first state. The second state is a state in which the deformation portion 210 is deformed under force. That is, when the deformation bearing member 200 is under force, the deformation portion 210 is deformed in the second state. In these optional embodiments, when the deformation portion 210 is in the natural state, the flexible screen 20 may be disposed on the deformable portion 210, and the flexible screen 20 and the curved cover plate 10 start to be laminated from the middle portion. During the lamination process, the deformation portion 210 is deformed to the second state, so that the flexible screen 20 and the curved cover plate 10 are gradually laminated from the middle to both sides.

In some other optional embodiments, the first state may also be a stress state of the deformation portion 210, the second state may be the natural state of the deformation portion 210, or both the first state and the second state are the stress state of the deformation part 210.

Please continue to refer to FIG. 2 and FIG. 3. In some optional embodiments, the lamination device 1 further includes a pressing table 600. The pressing table 600 includes an accommodating groove 610 for accommodating the curved cover plate 10. The pressing table 600 is located on a side of the flexible pad 300 away from the deformation bearing member 200, and the pressing table 600 is movably arranged along the height direction.

In these optional embodiments, during the lamination process of the curved cover plate 10 and the flexible screen 20, the curved cover plate 10 may be disposed in the pressing table 600, and the pressing table 600 may be driven to move in a direction close to the flexible pad 300, so that the curved cover plate 10 provides a pressing force on the flexible pad 300 to press the curved cover plate 10 on the flexible screen 20.

In some optional embodiments, the lamination device 1 further includes a guide film 800 for supporting the flexible screen 20. During the use of the lamination device 1, the flexible screen 20 may be disposed on the guide film 800 first, and then the guide film 800 may be disposed on the flexible support member 100. The guide film 800 is used to drive the flexible screen 20 onto the flexible support 100. The size of the guide film 800 is usually larger than those of the flexible screen 20 and the support surface 310.

Optionally, as shown in FIG. 3 and FIG. 4, the flexible pad 300 includes a ridge portion 300a located on a side thereof near the deformation portion 210. Both the spine segment 311 and the inclined segment 312 are disposed on the ridge portion 300a. Optionally, the flexible pad 300 further includes a plurality of wrapping portions 300b for wrapping the special-shaped bearing portions 220, the wrapping portions 300b are connected to sides of the ridge portion 300a, and the support surface 310 further includes a plurality of special-shaped segments 313 and inclined segments 312 disposed on the wrapping portions 300b. The inclined segment 312 is connected between one of the special-shaped segments 313 and the spine segment 311. In these optional embodiments, better support can be provided to the flexible screen 20 by providing the wrapping portions 300b to prevent the flexible screen 20 from being scratched by the deformation bearing member 200.

In FIG. 3, in order to show the structure of the flexible pad 300 more clearly, the ridge portion 300a and the wrapping portion 300b are defined on the flexible pad 300 by dotted lines. Optionally, the inclined segment 312 and the spine segment 311 of the support surface 310 are used to support the flexible screen 20 and the flat portion 11 of the curved cover plate 10 to be laminated, and the special-shaped segments 313 of the support surface 310 are used to support the flexible screen 20 and the curved portions 12 of the curved cover plate 10 to be laminated. The dotted lines do not constitute the structure of the lamination device 1 of the embodiment of the present disclosure.

The support member 100 can be arranged in various manners. For example, the support member 100 is fixedly connected to the side of the deformation portion 210 away from the flexible pad 300, and the support member 100 cannot be deformed in the height direction.

In some other optional embodiments, the deformation portion 210 is deformably arranged in the height direction via the support member 100. For example, an extension length of the support member 100 in the height direction is adjustable. When the pressing force on the curved cover plate 10 is not enough to deform the deformation portion 210, or in order to further improve the lamination efficiency, the support member 100 can provide a driving force toward the curved cover plate 10 on the deformation portion 210 by an adjustment of the extension length of the support member 100 in the height direction, in order to drive the deformation portion 210 to be deformed toward the curved cover plate 10.

In some other optional embodiments, as shown in FIG. 2 to FIG. 4, the lamination device 1 further includes a base 400. The support member 100 is supported and connected between the base 400 and the deformation portion 210. A relative position of the support member 100 and the base 400 in the height direction is adjustable. When the curved cover plate 10 applies the pressing force, the support member 100 can be driven to move toward the curved cover plate 10, and the support member 100 drives the deformation portion 210 to be deformed toward the curved cover plate 10.

For example, the base 400 includes a second chute 420 extending along the height direction, and the support member 100 is movably arranged in the second chute 420 along the height direction. For example, the second chute 420 is disposed across the base 400 in the height direction, and the support member 100 can be driven to move in the second chute 420 through the side of the base 400 facing away from the deformation bearing member 200.

In still other optional embodiments, the support member 100 may also be fixedly connected between the base 400 and the deformation portion 210.

The deformation bearing member 200 can be made of various materials. For example, the deformation bearing member 200 is made of an elastic steel plate, and the deformation portion 210 can be deformed by utilizing the structural elasticity of the elastic steel plate. The material of the deformation bearing member 200 may include alloy spring steel, for example, the material of the deformation bearing member 200 includes spring steel, for example, the spring steel is steel grade 60Si2MnA under Chinese standard GB/T 1222-1984.

The deformation portion 210 can be arranged in various ways. For example, the deformation portion 210 is formed by recessing from the special-shaped bearing portions 220 along the height direction. The deformation portion 210 includes an accommodating space, so that at least part of the flexible pad 300 can be accommodated in the accommodating space, and the deformation portion 210 can provide better support for the flexible pad 300.

In addition, in these optional embodiments, when the curved cover plate 10 applies a pressing force to the flexible screen 20 disposed on the support surface 310, the special-shaped bearing portions 220 moves in the direction of the pressing force, and the deformation portion 210 is deformed under the pressing action of the curved cover plate 10 and the support member 100. The deformation portion 210 acts on the flexible pad 300 through the fitting surface 320, so that the support surface 310 is deformed.

Optionally, when the deformation portion 210 is formed by recessing from the special-shaped bearing portions 220 in the height direction, the fitting surface 320 of the flexible pad 300 is adapted to the deformation portion 210 in shape, and the fitting surface 320 of the flexible pad 300 is arranged to protrude along a direction away from the support surface 310 and thus the thickness of the flexible pad 300 is inconsistent. For example, in the natural state, the fitting surface 320 is protruded in a direction away from the support surface 310, and the support surface 310 is protruded to be a ridge shape in a direction away from the fitting surface 320. When the flexible pad 300 is deformed under the action of the deformation portion 210, the fitting surface 320 is deformed toward the support surface 310 from the natural state, the support surface 310 is deformed toward the fitting surface 320, and the inclination of the inclined segment 312 gradually decreases.

Alternatively, in some other embodiments, the deformation portion 210 may be in the shape of a ridge in the natural state, and the flexible pad 300 is in the shape of a ridge under the support of the deformation portion 210. The deformation portion 210 can be deformed from the first state to the second state under the pressing action of the curved cover plate 10, and the flexible pad 300 is deformed with the deformation of the deformation portion 210.

When the deformation portion 210 is formed by recessing from the special-shaped bearing portions 220 along the height direction, the cross-section of the deformation portion 210 may be arc-shaped or V-shaped. For example, the cross-section of the deformation portion 210 is arc-shaped, so that the deformation portion 210 is more likely to be deformed by force and less likely to be wrinkled.

The cross-section of the deformation portion 210 is, for example, a cross-section along the length direction or the width direction of the lamination device 1. For example, the deformation bearing portions 220 are disposed opposite to each other along the width direction, the deformation portion 210 is connected between the two deformation bearing portions 220, and the cross section of the deformation portion 210 is the plane where the height direction and the width direction are located.

Optionally, the support member 100 is disposed in the middle of the two special-shaped bearing portions 220. For example, when the cross section of the deformation portion 210 is arc-shaped, the support member 100 is disposed at the top of the deformation portion 210 away from the flexible pad 300, so that the force of the deformation portion 210 is more balanced.

Figure 6:
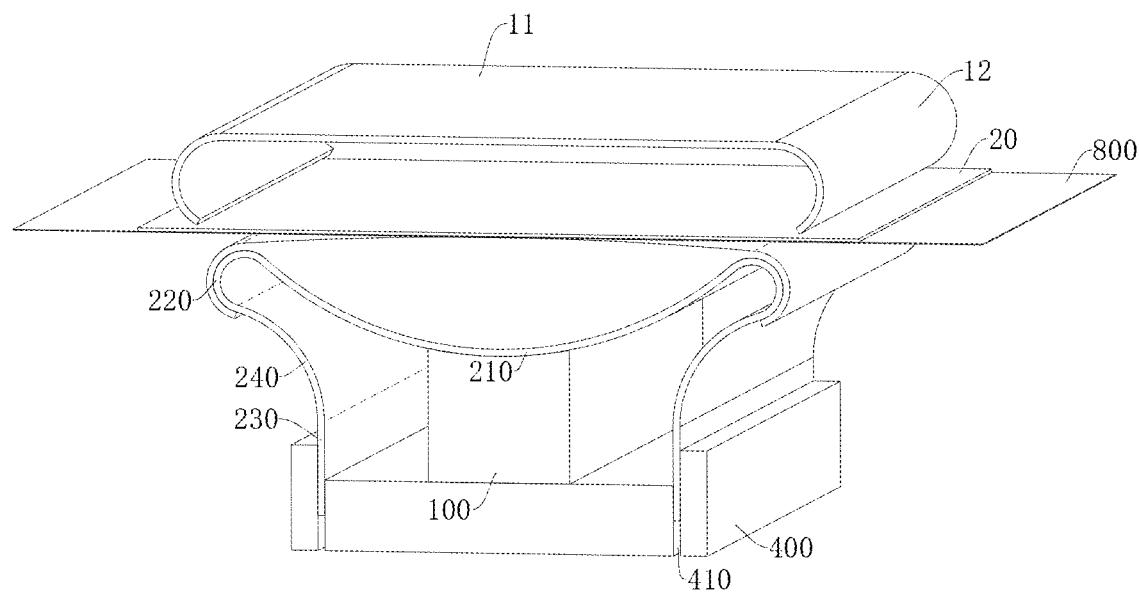
FIG. 6 is a schematic structural diagram of a lamination device provided by another embodiment of the first aspect of the present disclosure.
Figure 7:
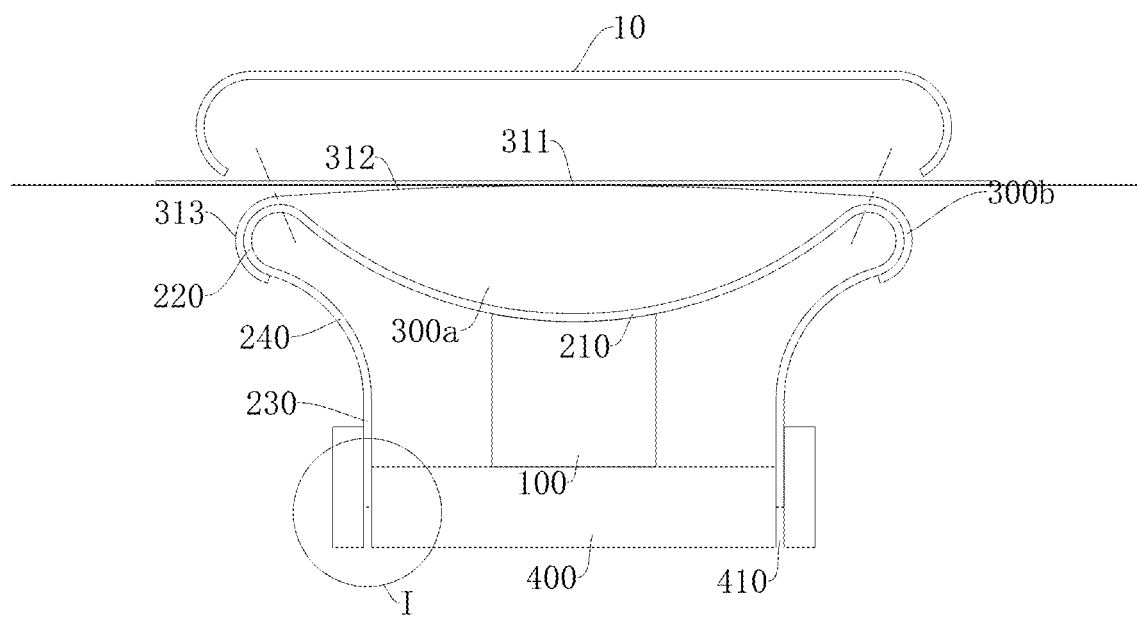
FIG. 7 is a front view of a lamination device provided by another embodiment of the first aspect of the present disclosure.

Please refer to FIG. 6 and FIG. 7 together. FIG. 6 is a schematic structural diagram of a lamination device 1 provided by another embodiment of the first aspect of the present disclosure. FIG. 7 is a front view of a lamination device 1 provided by another embodiment of the first aspect of the present disclosure.

In other embodiments, the deformation bearing member 200 further includes two side portions 230, and each side portion 230 is respectively supported on a side of each special-shaped carrier portion 220 away from the flexible pad 300. The side portions 230 are used to provide support to the special-shaped bearing portions 220. During the use of the lamination device 1, when the curved cover plate 10 is pressed against the flexible screen 20, the side portions 230 provide support to the special-shaped bearing portions 220, so that the flexible screen 20 is pressed between the special-shaped bearing portion 220 and the curved cover plate 10, to increase the force between the flexible screen 20 and the curved portions 12 of the curved cover plate 10, and improve air bubbles between the flexible screen 20 and the curved portions 12 and thus further improve lamination yield.

In order to improve the deformability of the deformation bearing member 200, in some optional embodiments, the deformation bearing member 200 further includes two transition connecting portions 240, and each transition connecting portion 240 is transitionally connected between one of the special-shaped bearing portions 220 and one of the side portions 230, the distance between the two transition connecting portions 240 gradually decreases in the direction from the flexible pad 300 to the base 400.

In these optional embodiments, the transitional connection portions 240 are connected between the side portions 230 and the special-shaped bearing portions 220, and the distance between the two transitional connection portions 240 gradually decreases in the direction from the flexible pad 300 to the base 400, That is, the transition connection portions 240 are curved, which can improve the deformability of the deformation bearing member 200.

During the use of the lamination device 1, when the curved cover plate 10 is pressed against the flexible screen 20, and when the deformation portion 210 changes from the first state to the second state, the transition connection portions 240 are deformed, and the special-shaped bearing portions 220 moves toward the side portions 230, but the deformation portion 210 will not move downward under the action of the support member 100. The movement of the special-shaped bearing portions 220 toward the side portions 230 can further improve the deformation degree of the deformation portion 210, further reduce the inclination angle of the inclined segment 312, and improve the lamination yield between the curved cover plate 10 and the flexible screen 20.

In some optional embodiments, in order to further improve the deformability of the deformation bearing member 200, the position of the special-shaped bearing portions 220 in the height direction can be adjusted via the side portions 230. For example, the extension length of the side portions 230 in the height direction is adjustable. When the curved cover plate 10 is pressed against the flexible screen 20 and the curved cover plate 10 provides a pressing force on the flexible screen 20, the side portions 230 shrink and deform in the height direction, thereby driving the special-shaped bearing portions 220 to move toward the side portions 230 and driving the deformation portion 210 to be more deformed.

In other optional embodiments, as shown in FIGS. 6 and 7, the lamination device 1 further includes the base 400, the side portions 230 are supported and connected between the special-shaped bearing portions 220 and the base 400, and the side portions 230 are connected to the base 400. The relative position between the side portions 230 and the base 400 in the height direction is adjustable. In these optional embodiments, when the curved cover plate 10 presses against the flexible screen 20, and the curved cover plate 10 provides a pressing force on the flexible screen 20, the side portions 230 move toward the base 400, thereby driving the special-shaped bearing portions 220 to move toward the side portions 230.

Figure 8:
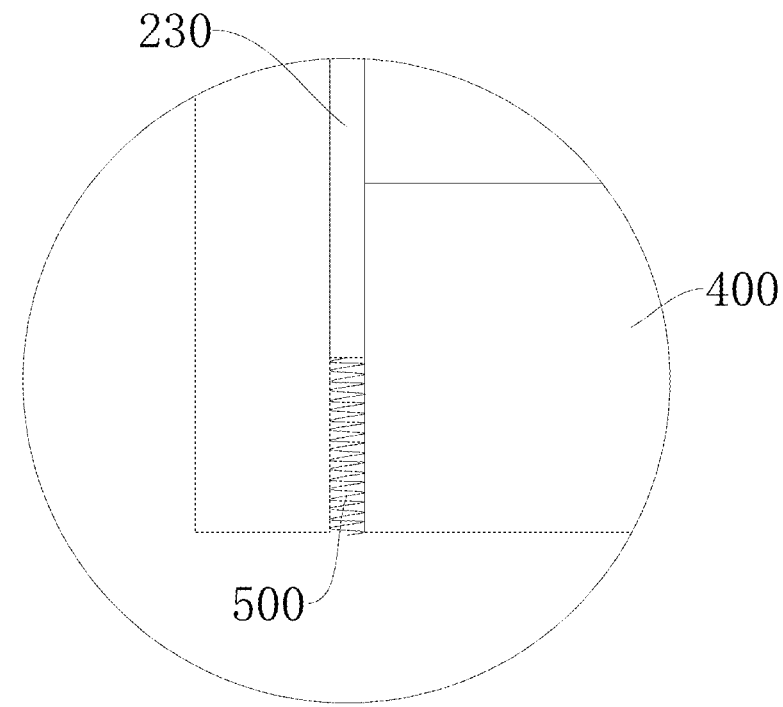
FIG. 8 is a partial enlarged structural diagram of Part I in FIG. 7.

Please refer to FIG. 8, FIG. 8 is a partial enlarged structural diagram of Part I in FIG. 7.

In some optional embodiments, as shown in FIG. 8, the base 400 is provided with a plurality of first chutes 410 extending in the height direction, ends of the side portions 230 away from the special-shaped bearing portions 220 are located in the first chutes 410, and the side portions 230 are movably arranged in the height direction relative to the first chutes 410. In these optional embodiments, the side portions 230 are movably arranged in the first chutes 410, so that the side portions 230 are slidably arranged relative to the base 400 in the height direction. When the curved cover plate 10 provides a pressing force on the flexible screen 20, the side portions 230 can move along the first chutes 410.

The first chutes 410 can be disposed in various ways. For example, the first chutes 410 are disposed through the base 400 in the height direction, which can increase a total moving distance of the side portions 230 in the height direction.

The side portions 230 and the first chutes 410 cooperate with each other in various ways. For example, the side portions 230 and the first chutes 410 is in interference fit. When the deformation bearing element 200 is in the natural state, the side portions 230 are supported in the second chute 420 by a frictional force between the side portions 230 and the inner wall surface of the first chutes 410. When the curved cover plate 10 applies a pressing force, and the pressure on the side portions 230 is greater than the friction force between the side portions 230 and the inner wall surface of the first chutes 410, the side portions 230 move in the height direction, which drives the special-shaped bearing portions 220 to move toward the side portions 230.

Alternatively, in other optional embodiments, please continue to refer to FIG. 8, one end of the side portion 230 away from the special-shaped bearing portion 220 is connected with a restoring member 500, and the restoring member 500 can be reciprocatingly deformed in the height direction. Through the reciprocating deformation of the restoring member 500, the side portions 230 can move in the height direction. The restoring member 500 is, for example, a spring.

In these optional embodiments, when the curved cover plate 10 does not provide the pressing force, the restoring member 500 is in a natural elongation state, and the side portions 230, the special-shaped bearing portions 220 and the deformation portion 210 are all in a natural state. When the curved cover plate 10 provides the pressing force, the restoring member 500 shrinks, the special-shaped bearing portions 220 move toward the side portions 230 under the pressing action of the curved cover plate 10, and the deformation portion 210 is deformed under the action of the support member 100. In addition, by disposing the restoring member 500 on the side portions 230, when the curved cover plate 10 and the flexible screen 20 are fully laminated and removed from the lamination device 1, the side portions 230 will recover under the action of the resilience of the restoring member 500. The lamination device 1 can continue to be used for laminating the next set of flexible screen 20 and curved cover plate 10.

Optionally, the side portions 230 are connected with the restoring member 500, the base 400 is also provided with the first chutes 410, the restoring member 500 is arranged in the first chutes 410, and the side portions 230 are movable in the first chutes 410 along the height direction via the restoring member 500.

Figure 9:
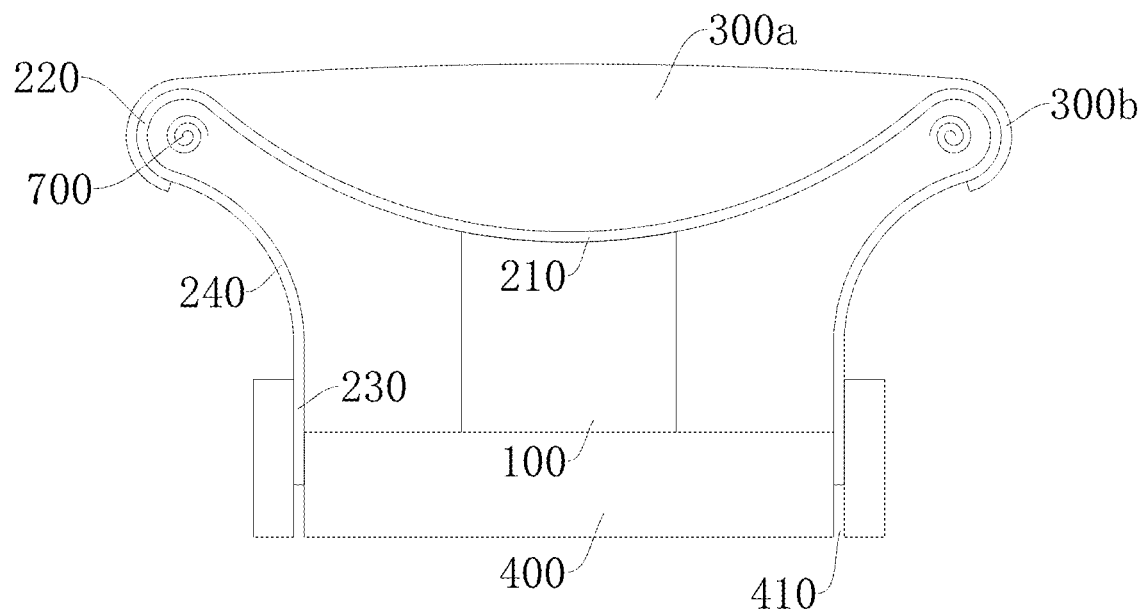
FIG. 9 is a schematic structural diagram of a lamination device provided by another embodiment of the first aspect of the present disclosure.

Please refer to FIG. 9. FIG. 9 is a schematic structural diagram of a lamination device 1 according to still another embodiment of the first aspect of the present disclosure.

In some optional embodiments, the lamination device 1 further includes a heating component 700 disposed on the side of the deformation bearing member 200 away from the flexible pad 300. The heating component 700 can provide thermal energy to the deformation bearing member 200, the flexible pad 300 and the flexible screen 20 located on the flexible pad 300, so that the flexible pad 300 has better deformability, and the flexible screen 20 has better flexibility, thereby improving the lamination air bubbles between the curved cover plate 10 and the flexible screen 20.

There are various installation positions of the heating member 700, for example, the heating component 700 is arranged on the side of the deformation portion 210 away from the flexible pad 300.

In other optional embodiments, the special-shaped bearing portions 220 is formed by bending from the deformation portion 210 in a direction away from the flexible pad 300, so as to form an avoidance space 221 on the side of the special-shaped bearing portions 220 away from the flexible pad 300, and the heating component 700 is arranged in the avoidance space 221.

In these optional embodiments, the heating component 700 is disposed in the avoidance space 221 formed by the special-shaped bearing portions 220, the heating component 700 can better heat the special-shaped bearing portions 220. The temperature of the special-shaped bearing portions 220 increases to make the special-shaped segments 313 of the flexible pad 300 have better deformability, so that the special-shaped portion of the flexible screen 20 is laminated better on the curved cover plate 10.

Figure 10:
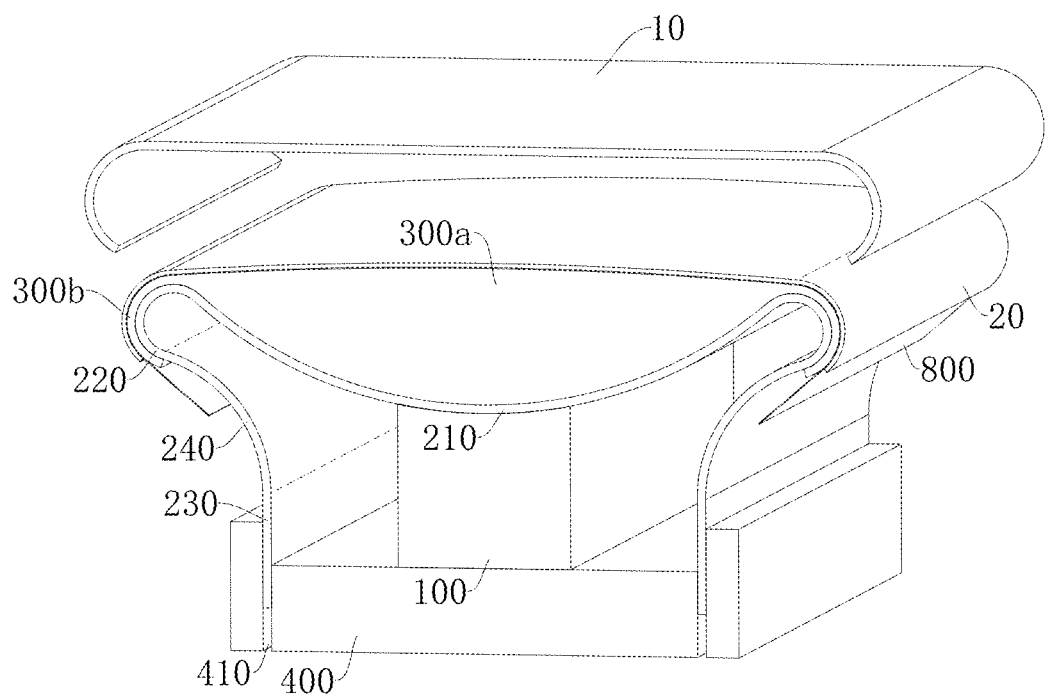
FIG. 10 is a schematic structural diagram of a lamination device provided by another embodiment of the first aspect of the present disclosure in a first state.
Figure 11:
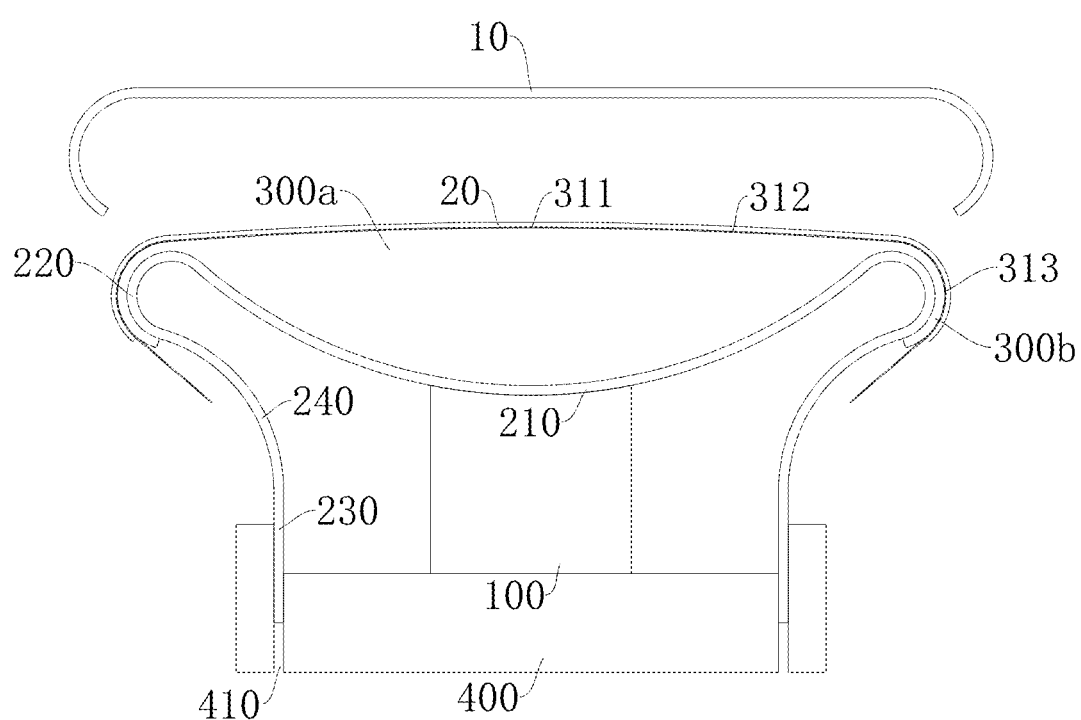
FIG. 11 is a front view of a lamination device provided by another embodiment of the first aspect of the present disclosure in a first state.
Figure 12:
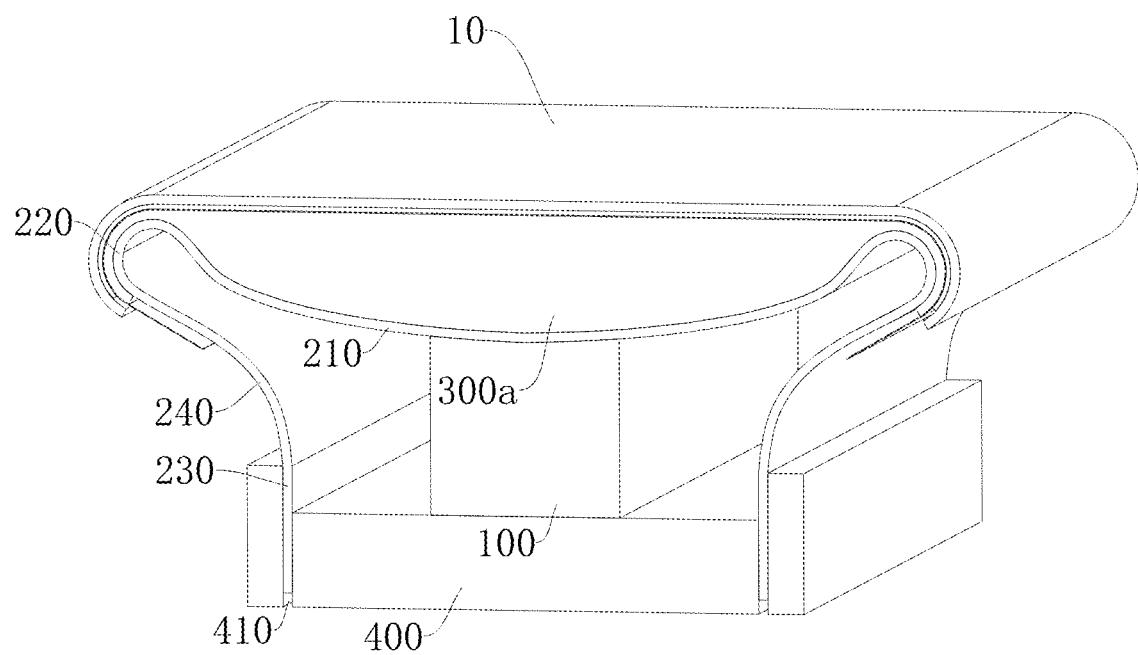
FIG. 12 is a schematic structural diagram of a lamination device provided by another embodiment of the first aspect of the present disclosure in a second state.
Figure 13:
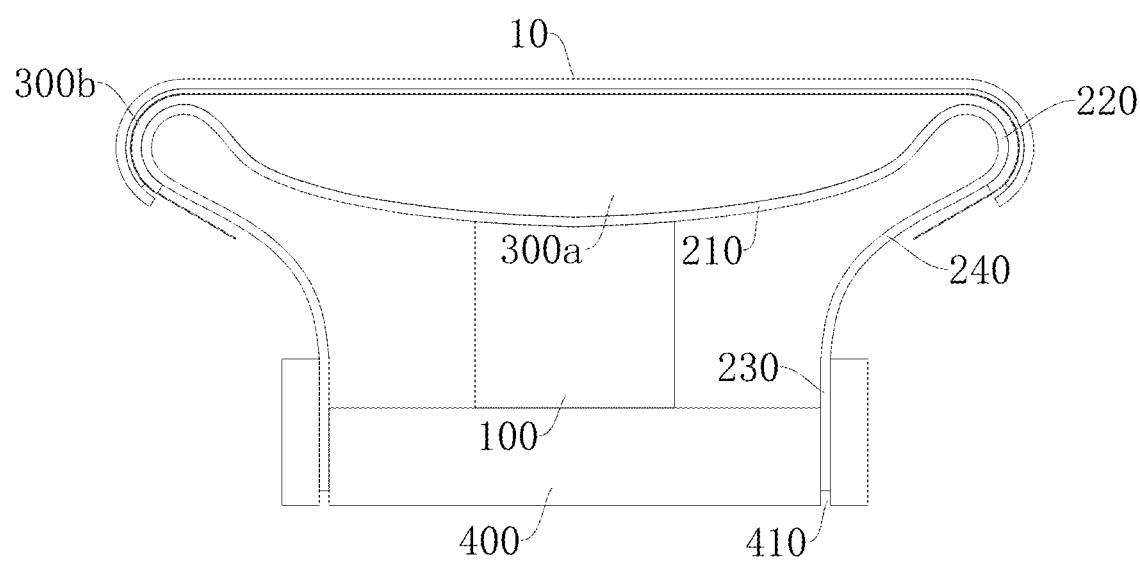
FIG. 13 is a front view of a lamination device provided in another embodiment of the first aspect of the present disclosure in a first state.

Please refer to FIG. 10 to FIG. 13 together. FIG. 10 is a schematic structural diagram of a lamination device 1 provided by another embodiment of the first aspect of the present disclosure in a first state. FIG. 11 is a front view of a lamination device 1 provided by another embodiment of the first aspect of the present disclosure in a first state. FIG. 12 is a schematic structural diagram of a lamination device 1 provided by another embodiment of the first aspect of the present disclosure in a second state. FIG. 13 is a front view of a lamination device 1 provided in another embodiment of the first aspect of the present disclosure in a first state.

According to the lamination device 1 of the embodiment of the present disclosure, as shown in FIG. 10 and FIG. 11, in the initial stage of pressing, the deformation portion 210 is in the first state, the curved cover plate 10 first and the flexible screens 20 supported on the upper spine segment 311 of the flexible pad 300 are at first laminated to each other. As shown in FIG. 12 and FIG. 13, when pressure is applied on the curved cover plate 10, or the position of the support member 100 in the height direction is adjusted, during the process that the deformation portion 210 is deformed from the first state to the second state, the contact between the curved cover plate 10 and the flexible screen 20 is gradually pressing from the middle to the two sides. Finally, the curved cover plate 10 and the flexible screen 20 are completely laminated.

The embodiments of the present disclosure can effectively improve the lamination air bubbles between the curved cover plate 10 and the flexible screen 20, and improve the product yield. And in the first state, the size of the deformation bearing member 200 in the width direction is small, and when the bending angle of the curved portions 12 of the curved cover 10 is large, the flexible screen 20 located on the deformation bearing member 200 and the flexible pad 300 can still be gradually pressed to the curved cover plate 10 from the middle to the two sides.

In some optional embodiments, the deformation portion 210 and the special-shaped bearing portions 220 of the deformation bearing member 200 are adapted to the curved cover plate 10 in shape. When the curved cover plate 10 is provided with a digging hole, the corresponding position of the deformation portion 210 is provided with a through hole to prevent the flexible pad 300 from rubbing against a hole wall of the digging hole under the pressing of the curved cover plate 10 and the deformation portion 210.

There are various ways to set the thickness of the deformation bearing member 200. In some optional embodiments, the thickness of the deformation bearing member 200 is 0.5 mm~3 mm. When the thickness of the deformation bearing member 200 is between 0.5 mm and 3 mm, it can not only prevent the deformation bearing member 200 from being unable to bear the flexible screen 20 and the curved cover plate 10 due to the insufficient thickness of the deformation bearing member 200, but also prevent the deformation bearing member 200 from being too thick thereby making it difficult to be deformed. Further, the thickness of the deformation bearing member 200 is 1 mm~2 mm.

The material of the flexible pad 300 can be set in various ways, for example, the material of the flexible pad 300 includes silica gel, or the material of the flexible pad 300 includes polyimide film, polyester film, magnesium fluoride film, zinc sulfide film, organic-inorganic laminated film one or more of them. The use of these materials can ensure that the flexible pad 300 has good flexibility.

Figure 14:
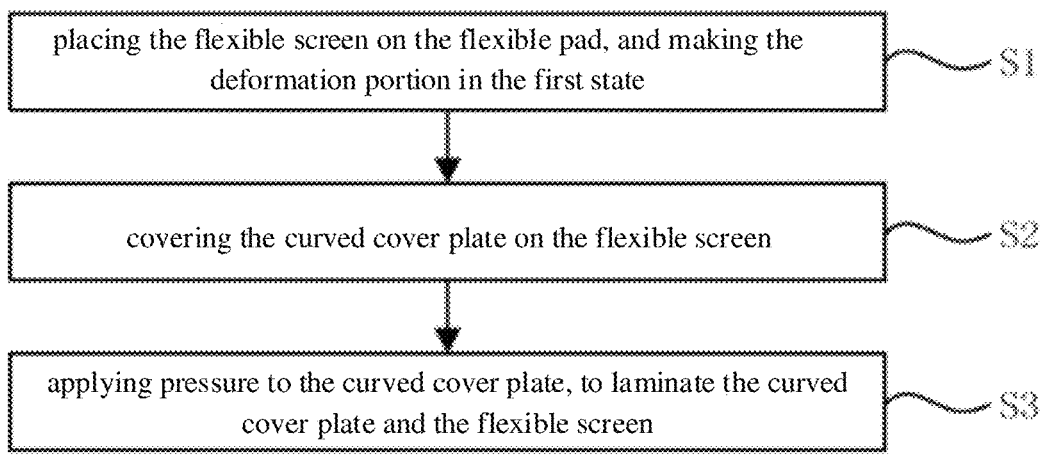
FIG. 14 is a flowchart of a lamination method provided by an embodiment of a second aspect of the present disclosure.

Please also refer to FIG. 14. FIG. 14 is a schematic flowchart of a lamination method provided by an embodiment of the second aspect of the present disclosure.

According to the lamination method provided by the embodiment of the second aspect of the present disclosure, the lamination method is used for laminating the curved cover plate 10 and the flexible screen 20. The method can be completed using the lamination device 1 of any of the above-mentioned embodiments, and the lamination method includes:

step S1: placing the flexible screen 20 on the flexible pad 300, and making the deformation portion 210 in the first state.

As described above, when the deformation portion 210 is in the first state, the support surface 310 of the flexible pad 300 is in the shape of a ridge. When the lamination device 1 includes the base 400, the distance from the spine segment 311 to the base 400 is greater than the distance from the special-shaped segments 313 to the base 400.

When the lamination device 1 includes the guide film 800, the guide film 800 is firstly disposed on the flexible pad 300, and then the flexible screen 20 is placed on the guide film 800. The guide film 800 with the flexible screen 20 is then placed on the flexible pad 300. When the curved cover plate 10 has not been pressed, the deformation portion 210 is in the first state.

When the deformation bearing member 200 is in the state shown in FIG. 4 in a natural state, the flexible screen 20 is directly disposed on the flexible pad 300 during use. When the deformation bearing member 200 is in the state shown in FIG. 5 in a natural state, before the flexible screen 20 is set on the deformation carrier 200, or after the flexible screen 20 is disposed on the deformation bearing member 200, the deformation portion 210 is driven to be in the first state.

Step S2: the curved cover plate 10 covers the flexible screen 20.

When the lamination device 1 includes the pressing table 600, the curved cover plate 10 can be arranged in the accommodating groove of the pressing table 600, so that the pressing table 600 can drive the curved cover plate 10 to move and the curved cover plate 10 cover the flexible screen 20. Since the support surface 310 of the flexible pad 300 is in the shape of a ridge when the deformation portion 210 is in the first state, the curved cover plate 10 is firstly laminated to a part of the flexible screen 20 supported by the spine segment 311.

Step S3: pressure is applied to the curved cover plate 10 to make the curved cover plate 10 and the flexible screen 20 to be laminated to each other.

The pressure is applied to the curved cover plate 10, so that the deformation portion 210 is deformed from the first state to the second state, the two special-shaped bearing portions 220 move in a direction away from each other, and the curved cover plate 10 and the flexible screen 20 are gradually laminated from a position corresponding to the spine segment 311.

In these optional embodiments, when the curved cover plate 10 is provided on the pressing table 600, the pressing table 600 applies pressure to the curved cover plate 10, so that the deformation portion 210 is deformed from the first state to the second state, and the curved cover plate 10 and the flexible screen 20 are gradually laminated. Since the contact between the flexible screen 20 and the curved cover plate 10 is gradually pressed from the middle to the two sides, the lamination air bubbles between the curved cover plate 10 and the flexible screen 20 can be effectively eliminated, and the yield of the product can be improved.

Those skilled in the art should understand that the above-mentioned embodiments are all illustrative and not restrictive. Different technical features appearing in different embodiments can be combined to achieve beneficial effects. Those skilled in the art should be able to understand and implement other variant embodiments of the disclosed embodiments on the basis of studying the drawings, the description and the claims. The mere presence of certain technical features in different dependent claims does not imply that these features cannot be combined to obtain advantageous effects.

What is claimed is:

1. A lamination device comprising:
a support member;
a deformation bearing member, comprising a plurality of bearing portions arranged opposite each other and a deformation portion connected between the plurality of bearing portions, wherein the deformation portion is supported by the support member and a cross section of the deformation portion is arc-shaped;
a flexible pad, arranged on a side of the deformation bearing member away from the support member, wherein the flexible pad comprises a support surface for supporting a flexible screen and a fitting surface fitted with the deformation portion, the support surface comprises a spine segment located on a side of the deformation portion away from the support member and a plurality of inclined segments located on both sides of the spine segment, wherein the deformation portion is deformable from a first state to a second state under the action of a force along a height direction of the lamination device, so as to change the shape of the support surface via the deformation of the deformation portion, the support member is fixedly connected between a base and the deformation portion, the support member cannot be deformed in the height direction, when the deformation portion is in the first state, the support surface is in the shape of a ridge, and in the process of the deformation portion changing from the first state to the second state, an inclination of the inclined segments gradually decreases,
the deformation bearing member further comprises two side portions, the two side portions are respectively supported and connected to a side of respective bearing portions away from the flexible pad, and positions of the plurality of bearing portions in the height direction are adjustable via the side portions; and
the base, wherein the side portions are supported and connected between the plurality of bearing portions and the base, and a position of the side portions relative to the base in the height direction is adjustable.

2. The lamination device according to claim 1, wherein the deformation portion is formed by recessing along the height direction from the plurality of bearing portions.

3. The lamination device according to claim 2, wherein the flexible pad comprises a ridge portion located within the deformation portion, and both the spine segment and the inclined segments are located on the ridge portion.

4. The lamination device according to claim 1, wherein the flexible pad further comprises a plurality of wrapping portions for wrapping the bearing portions, the support surface further comprises a plurality of segments arranged on the wrapping portions, and the inclined segments are connected between the spine plurality of segments and the segment.

5. The lamination device according to claim 1, wherein the deformation bearing member further comprises two transition connection portions, each of the two transition connection portions is transitionally connected between the respective bearing portions and the respective side portions, and a distance between the two transition connection portions gradually decreases in a direction from the flexible pad to the support member.

6. The lamination device according to claim 1, wherein the base is provided with a plurality of first chutes extending along the height direction, ends of the side portions away from the plurality of bearing portions are located in the first chutes, and the side portions are movably arranged relative to the first chutes along the height direction.

7. The lamination device according to claim 6, wherein each of the first chutes penetrates the entire base along the height direction.

8. The lamination device according to claim 1, wherein a restoring member is connected to an end of each of the side portions away from the plurality of bearing portions, and the restoring member is reciprocally deformable in the height direction.

9. The lamination device according to claim 1, further comprising: a heating component disposed on a side of the deformation bearing member away from the flexible pad.

10. The lamination device according to claim 9, wherein the plurality of bearing portions is formed by bending from the deformation portion in a direction away from the flexible pad, to form an avoidance space on a side of each bearing portion of the plurality of bearing portions away from the flexible pad, and the heating component is arranged in the avoidance space.

11. The lamination device of claim 1, wherein two bearing portions are disposed opposite to each other along a width direction of the lamination device, the deformation portion is connected between the two bearing portions, and the cross section of the deformation portion is the plane where the height direction of the lamination device and the width direction are located.

12. The lamination device of claim 1, wherein the deformation portion further comprising a through hole configured to prevent the flexible pad from rubbing against a hole wall of a digging hole in a curved cover plate.

13. A lamination method using the lamination device according to claim 1 to laminate a curved cover plate to a flexible screen, the method comprising steps of:
placing the flexible screen on the flexible pad, to locate the deformation portion in the first state;
covering the curved cover plate on the flexible screen; and
applying pressure to the curved cover plate, to deform the deformation portion from the first state to the second state, to move the plurality of bearing portions in a direction away from each other, and the curved cover plate and the flexible screen being gradually laminated from a position corresponding to the spine segment.

* * * * *